US012567901B2

(12) United States Patent
Sun et al.

(10) Patent No.: US 12,567,901 B2
(45) Date of Patent: Mar. 3, 2026

(54) METHOD AND DEVICE FOR TIME DIVISION DUPLEX ASYNCHRONOUS SATELLITE COMMUNICATIONS, AND STORAGE MEDIUM

(71) Applicant: Beijing University of Posts & Telecommuncations, Beijing (CN)

(72) Inventors: Yaohua Sun, Beijing (CN); Yu Zhou, Beijing (CN); Renzhi Yuan, Beijing (CN); Mugen Peng, Beijing (CN)

(73) Assignee: Beijing University of Posts & Telecommunications, Beijing (CN)

( * ) Notice: Subject to any disclaimer, the term of this patent is extended or adjusted under 35 U.S.C. 154(b) by 323 days.

(21) Appl. No.: 18/357,418

(22) Filed: Jul. 24, 2023

(65) Prior Publication Data

US 2024/0048228 A1     Feb. 8, 2024

(30) Foreign Application Priority Data

Jul. 26, 2022     (CN) .......................... 202210887673.8

(51) Int. Cl.
*H04B 7/185* (2006.01)
*H04L 5/14* (2006.01)
*H04W 56/00* (2009.01)

(52) U.S. Cl.
CPC ....... *H04B 7/18513* (2013.01); *H04L 5/1469* (2013.01); *H04W 56/0045* (2013.01)

(58) Field of Classification Search
CPC .............. H04B 7/1851; H04B 7/18513; H04B 7/18539; Y02D 30/70; H04L 5/1469; H04L 27/2607; H04W 56/0045
See application file for complete search history.

(56) References Cited

U.S. PATENT DOCUMENTS

| | | | | |
|---|---|---|---|---|
| 8,477,716 B2* | 7/2013 | Gossain | ................ | H04W 24/10 |
| | | | | 370/332 |
| 9,402,268 B2* | 7/2016 | Taori | ...................... | H04W 72/20 |
| 9,407,419 B2* | 8/2016 | Yang | ...................... | H04W 72/23 |

(Continued)

FOREIGN PATENT DOCUMENTS

| | | |
|---|---|---|
| CN | 110602779 A | 12/2019 |
| WO | 2022/042289 A1 | 3/2022 |

OTHER PUBLICATIONS

Dynamic uplink frame optimization with ACM in DVB-RCS2 satellite networks.

(Continued)

*Primary Examiner* — Bailor C Hsu
(74) *Attorney, Agent, or Firm* — Maginot, Moore & Beck, LLP

(57)     ABSTRACT

A method and an apparatus v are provided. The method includes: configuring a frame structure and related parameters of a satellite based on a channel feature, a service feature, and a transmission/reception unit capability; determining a resource scheduling scheme based on configuration information of the frame structure and related parameters and historical resource scheduling information; and performing a timing error compensation on the resource scheduling scheme based on a timing advance obtained by time-frequency synchronization, and performing a data transmission/reception based on the resource scheduling scheme after the timing error compensation.

12 Claims, 12 Drawing Sheets

(56)                        References Cited

U.S. PATENT DOCUMENTS

|   |   |   |   |   |
|---|---|---|---|---|
| 9,820,225 | B2 * | 11/2017 | Ang | H04W 28/0221 |
| 11,469,815 | B2 * | 10/2022 | Hsieh | H04B 7/01 |
| 2007/0184778 | A1 | 8/2007 | Mechaley, Jr. | |
| 2015/0270890 | A1 | 9/2015 | Vasavada et al. | |
| 2017/0164377 | A1 * | 6/2017 | Ho | H04W 36/0088 |
| 2017/0257238 | A1 * | 9/2017 | Qian | H04L 25/03834 |
| 2018/0183551 | A1 * | 6/2018 | Chou | H04L 5/001 |
| 2018/0227856 | A1 * | 8/2018 | Yang | H04W 52/0274 |
| 2018/0241464 | A1 | 8/2018 | Michaels | |
| 2019/0349077 | A1 | 11/2019 | Alasti et al. | |
| 2024/0172144 | A1 * | 5/2024 | Liu | H04W 56/0045 |

OTHER PUBLICATIONS

Mixed Duplex Transmission Method Based on Satellite Communication TDMA.

* cited by examiner

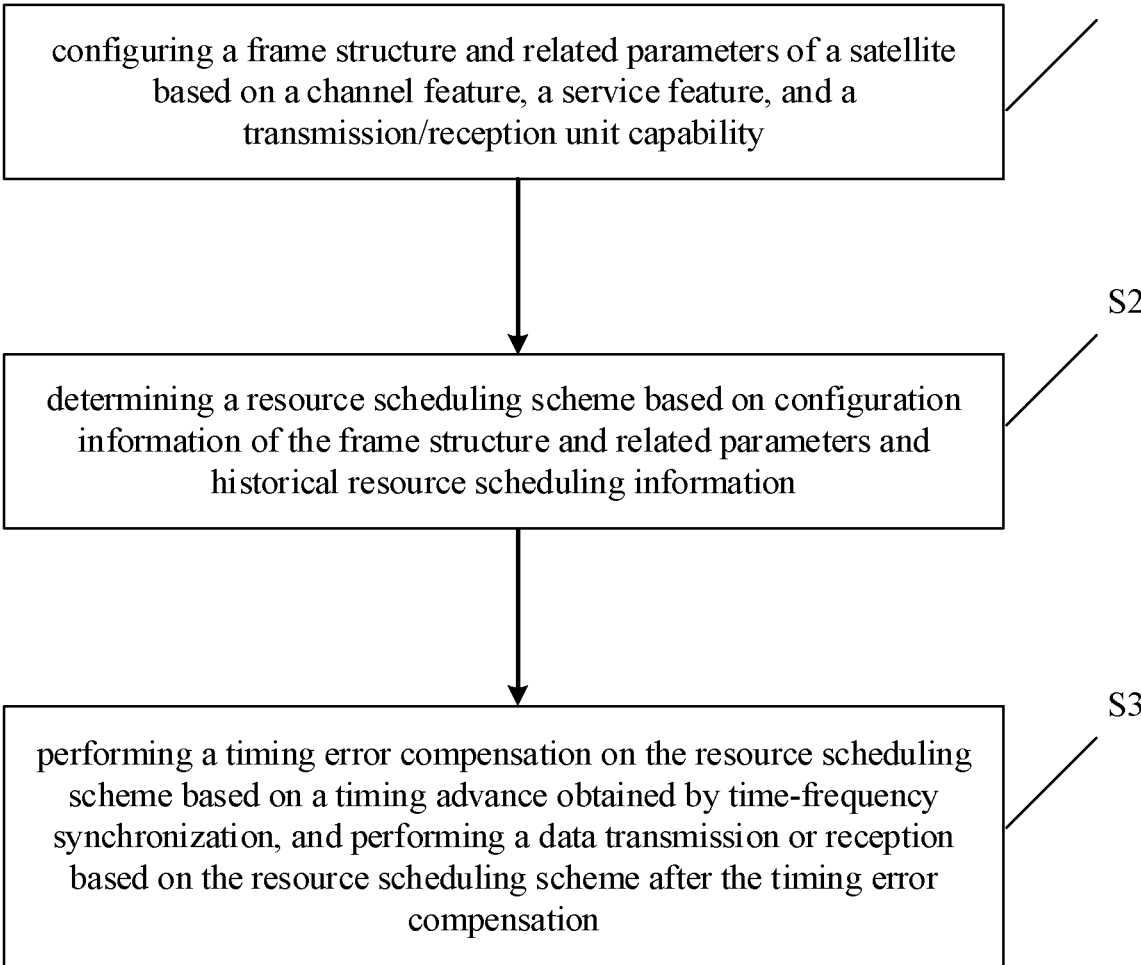

S1 configuring a frame structure and related parameters of a satellite based on a channel feature, a service feature, and a transmission/reception unit capability

S2 determining a resource scheduling scheme based on configuration information of the frame structure and related parameters and historical resource scheduling information

S3 performing a timing error compensation on the resource scheduling scheme based on a timing advance obtained by time-frequency synchronization, and performing a data transmission or reception based on the resource scheduling scheme after the timing error compensation

FIG. 1

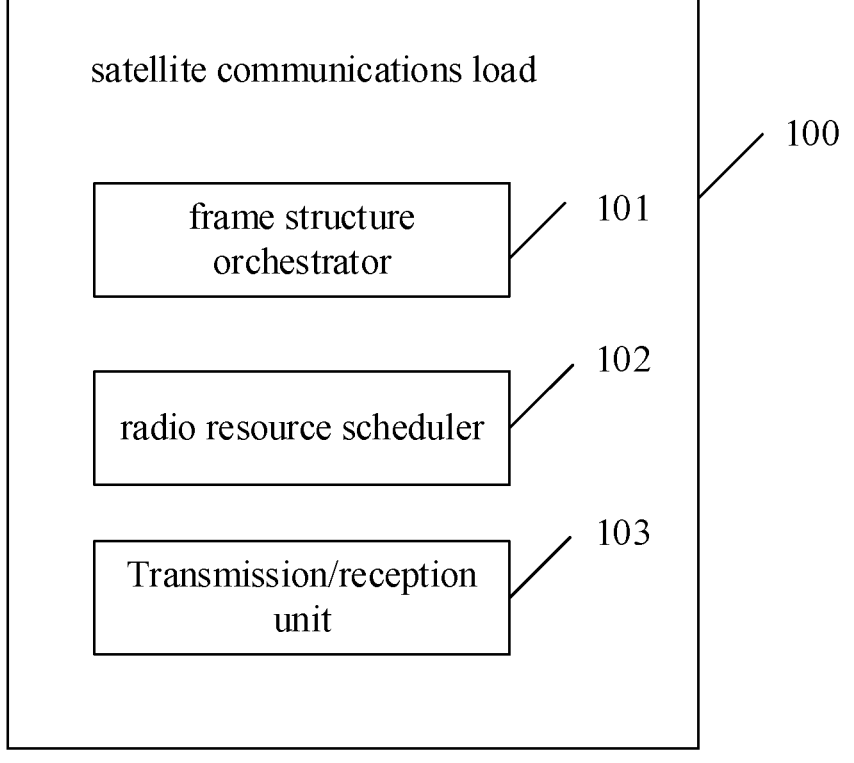
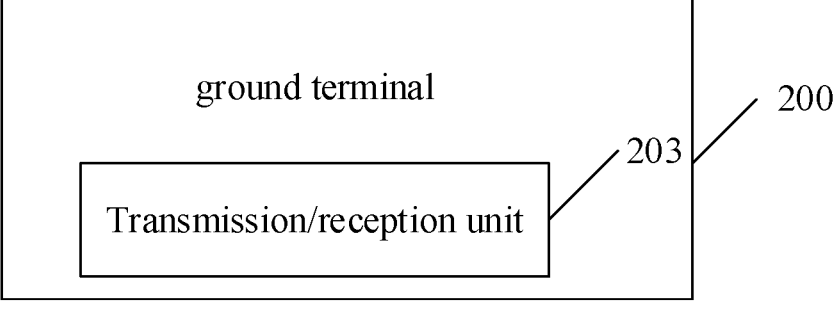
FIG. 2 based on a sine law,   $\dfrac{R+h}{d} = \dfrac{\sin(\frac{\pi}{2}+\theta)}{\sin \alpha}$ based on a cosine law,   $d^2 = R^2 + (R+h)^2 - 2R(R+h)\cos \alpha$

| cellSelectionInfo | cellAccessRelatedInfo |
|---|---|
| connEstFailureControl | si-SchedulingInfo |
| servingCellConfigCommon | ims-EmergencySupport |
| eCallOverIMS-Support | ue-TimerAndConstans |
| uac-BarringInfo | useFullResumeID | including frame structure configuration field

FIG. 7

$\vdots$

| uplink scheduling identity | user identity | DCI transmitting moment $t'_{u0}$ | uplink slot offset K | allocated RBs |
| --- | --- | --- | --- | --- |

| downlink scheduling identity | user identity | DCI transmitting moment $t_{d0}$ | allocated RBs |
|---|---|---|---|

FIG. 9 satellite communications
load FFT receiving window satellite communications load ground terminal no timing offset a timing offset is negative
and perform a transmitting
compensation $|TA_{error} - T_{offset}|$ configuration
module 10 scheduling module
20 compensation
module 30

METHOD AND DEVICE FOR TIME DIVISION DUPLEX ASYNCHRONOUS SATELLITE COMMUNICATIONS, AND STORAGE MEDIUM

CROSS-REFERENCE TO RELATED APPLICATION

This application is based upon and claims priority to Chinese Patent Application No. 202210887673.8, filed on Jul. 26, 2023, the entire content of which is incorporated herein by reference.

TECHNICAL FIELD

The disclosure belongs to the technology field of satellite communications.

BACKGROUND

Compared with ground communications, satellite communications have characteristics of wide communication coverage and small impact by ground environment. Compared with frequency division duplex (FDD) widely and currently applied in the field of satellite communications, time division duplex (TDD) may flexibly configure an uplink duration and a downlink duration according to service types, thereby effectively improving the spectrum utilization. At the same time, a satellite may avoid channel estimation on an uplink channel and a downlink channel respectively by using channel reciprocity, thereby saving the system overhead and facilitating applications of satellite-borne phased array antenna. In addition, the TDD technology converts between a transmitting state and a receiving state by a switch circuit, which is simpler in design and is more robust against cosmic space radiation interferences, compared with a duplexer in the FDD. Finally, the TDD satellite communications system does not need to plan a pair of spectrum resources, which is convenient to deploy.

SUMMARY

A method for time division duplex (TDD) non-geosynchronous satellite communications is provided in a first aspect of the disclosure and includes the following steps.

At S1, a frame structure and related parameters of a satellite are configured based on a channel feature, a service feature, and a transmission/reception unit capability.

At S2, a resource scheduling scheme is determined based on configuration information of the frame structure and related parameters and historical resource scheduling information.

At S3, a timing error compensation is performed on the resource scheduling scheme based on a timing advance obtained by time-frequency synchronization, and a data transmission/reception is performed based on the resource scheduling scheme after the timing error compensation.

A computer device is provided in a second aspect of the disclosure. The computer device includes a memory, a processor, and a computer program stored on the memory and executable by the processor, in which when the processor executes the computer program, the above method is implemented.

A non-transitory computer-readable storage medium with a computer program stored thereon is provided in a third aspect of the disclosure. When the computer program is executed by a processor, the above method is implemented.

BRIEF DESCRIPTION OF THE DRAWINGS

The above and/or additional aspects and advantages of the disclosure will become obvious and easy to understand from the following description of embodiments in conjunction with the accompanying drawings, in which:

FIG. 1 is a flowchart illustrating a method for TDD non-geosynchronous satellite communications according to embodiments of the disclosure.

FIG. 2 is a diagram illustrating components in an on-satellite processing implementation.

FIG. 7 is a diagram illustrating fields of a system information block.

Figure 8:
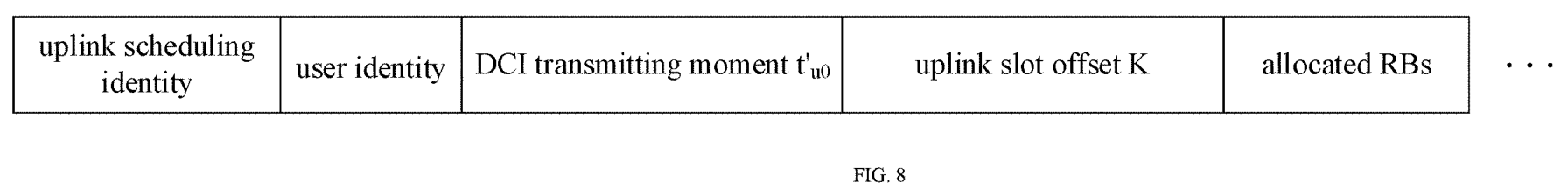

FIG. 8 is a diagram illustrating a storage format of uplink information in a scheduling information table.

FIG. 9 is a diagram illustrating a storage format of downlink information in a scheduling information table.

DETAILED DESCRIPTION

Figure 3:
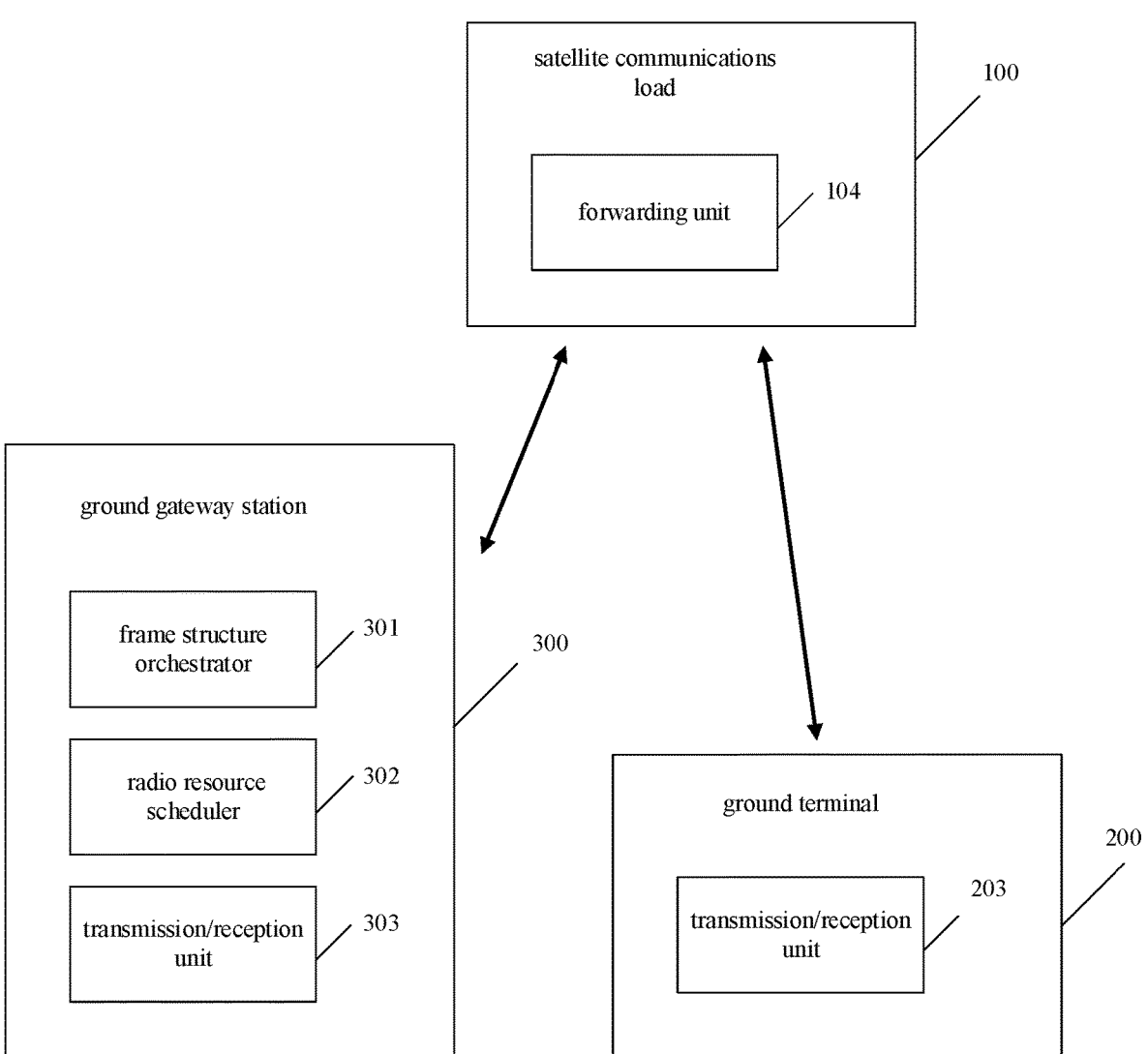
FIG. 3 is a diagram illustrating components in a transparent forwarding implementation.

Embodiments of the disclosure are described in detail below and examples of embodiments are illustrated in the accompanying drawings, in which the same or similar numerals in the accompanying drawings represent the same or similar elements or elements with the same or similar functions throughout the descriptions. The embodiments described below with reference to the drawings are exemplary, aim to explain the disclosure, and are not to be construed as a limitation of the disclosure.

A method and an apparatus for TDD non-geosynchronous satellite communications according to embodiments of the disclosure are described below with reference to the accompanying drawings.

Embodiment 1

FIG. 1 is a flowchart illustrating a method for TDD non-geosynchronous satellite communications according to embodiments of the disclosure.

As illustrated in FIG. 1, the method for TDD non-geosynchronous satellite communications includes the following steps.

At S1, a frame structure and related parameters of a satellite are configured based on a channel feature, a service feature, and a transmission/reception unit capability.

At S2, a resource scheduling scheme is determined based on configuration information of the frame structure and related parameters and historical resource scheduling information.

At S3, a timing error compensation is performed on the resource scheduling scheme based on a timing advance obtained by time-frequency synchronization, and a data transmission/reception is performed based on the resource scheduling scheme after the timing error compensation.

An implementation device suitable for the solution may be given in the disclosure and an on-satellite processing implementation and a transparent forwarding implementation may be classed according to different application scenarios.

In the on-satellite processing implementation, the implementation device includes a satellite communications load 100 and a ground terminal 200. The satellite communications load 100 further includes a frame structure orchestrator 101, a radio resource scheduler 102, and a transmission/reception unit 103. The satellite communications load provides simultaneously communications services for different ground areas by a multi-beam solution. A beam aiming position may be fixed either relative to the ground or relative to the satellite position. The ground terminal includes a transmission/reception unit 203, which may include a baseband processing unit and a radio frequency (RF) processing unit. The baseband processing unit and the RF processing unit are technical terms in the related art. The baseband processing unit is responsible for modulation and demodulation of baseband signals and the RF processing unit is responsible for modulation and demodulation of baseband signals to RF signals.

In the transparent forwarding implementation, the implementation device includes a satellite communications load 100, a ground terminal 200, and a ground gateway station 300. The ground terminal includes a transmission/reception unit 203. The satellite communications load includes a forwarding unit 104. The ground gateway station includes a frame structure orchestrator 301, a radio resource scheduler 302, and a transmission/reception unit 303. The forwarding unit 104 may receive signals from the ground terminal or from the ground gateway station, and forward the signals to the ground gateway station or to the ground terminal. Since content related to two implementations in the disclosure are identical, the following description of the summary is based on the on-satellite processing scenario.

The frame structure orchestrator 101 and the frame structure orchestrator 301 are responsible for configuration of frame structure and basic parameters and orchestration of uplink and downlink subframes. The input of the frame structure orchestrator includes a Doppler frequency offset compensation capability of the on-satellite transmission/reception unit and a Doppler frequency offset compensation capability of the transmission/reception unit of the ground terminal; a satellite altitude; a center position, a beam coverage area, and a service type of a respective beam, and the like. The output of the frame structure orchestrator includes a subcarrier spacing, an orthogonal frequency division multiplexing (OFDM) symbol length, a cyclic prefix (CP) length, an uplink and downlink configuration period, and a frame structure, used for communications between the satellite and the user.

Further, in an embodiment of the disclosure, configuring the frame structure and related parameters of the satellite based on the channel feature, the service feature, and the transmission/reception unit capability, includes:

performing a Doppler frequency offset pre-compensation on a respective beam based on a center position of the respective beam, a position of the satellite, and a speed and a direction of the satellite;

determining a maximum subcarrier spacing based on an altitude of the satellite and beam coverage information;

determining an OFDM symbol length and a CP length based on the maximum subcarrier spacing;

calculating a motion speed of the satellite relative to the earth based on the altitude of the satellite, and determining a maximum timing-advance update period based on the motion speed of the satellite relative to the earth in combination with a rotation speed of the earth;

determining a frame structure configuration period based on the maximum timing-advance update period; and performing an uplink and downlink frame structure orchestration based on a support service by taking a subframe as a unit.

In detail, S1 may include the following steps.

At S101, the satellite transmission/reception unit 103 performs the Doppler frequency offset pre-compensation on the respective beam based on the center position of the respective beam, the current position of the satellite, and the speed and the direction of the satellite. A compensation value f' may be calculated by the formula of:

$$f' = \frac{v \times f}{c} \times \cos\theta_1,$$

where v is a relative speed between the ground terminal and the satellite, c is a speed of light and a general value of the speed of light is $3 \times 10^8$ m/s, f is a carrier frequency point used by the satellite communications load, and $\theta_1$ is an included angle formed by a current speed direction of the satellite and a line between the satellite and the center of the beam. The frame structure orchestrator 101 determines a minimum subcarrier spacing based on a Doppler frequency offset residue after the frequency offset compensation. A subcarrier spacing SCS of a certain beam shall satisfy the limitation of:

$$SCS \geq \frac{\overline{\Delta f}_{max}}{\Delta f},$$

where $\Delta f$ is a tolerable frequency offset percentage, which affects a demodulation accuracy rate of a receiver and may be set based on a specific demand and is generally set to 5%. $\overline{\Delta f}_{max}$ is a maximum residual Doppler frequency offset of the on-satellite transmission/reception unit and the ground transmission/reception unit after compensation in the beam, which is calculated by the formula of:

$$\overline{\Delta f}_{max} = \max_{\theta_2} \left| \frac{v \times f}{c} \times (\cos\theta_1 - \cos\theta_2) \right|,$$

where $\theta_2$ is an included angle formed by the current speed direction of the satellite and a line between the satellite and a spot within a beam coverage range.

When the satellite beam is fixed relative to the ground area, the satellite shall preferentially consider that the same subcarrier spacing is configured for each beam. In this case, $\overline{\Delta f}_{max}$ shall be a maximum value of Doppler frequency offset residues of all optional beams in the satellite coverage area. Assuming that a coverage radius of each beam is the same, the maximum value may appear at a subastral spot beam, and a corresponding maximum Doppler frequency offset residue $\overline{\Delta f}_{max}$ may be calculated by the formula of:

$$\overline{\Delta f}_{max} = \left| \frac{v \times f}{c} \times \frac{d}{\sqrt{d^2 + h^2}} \right|,$$

where h is a satellite altitude, and d is a farthest distance between a subastral spot beam boundary and a subastral spot.

In the transparent forwarding implementation, functions of the transmission/reception unit 103 and the frame structure orchestrator 101 of the satellite at S101 are completed by the transmission/reception unit 303 and the frame structure orchestrator 301 of the ground gateway station.

At S102, the frame structure orchestrator 101 determines an available maximum subcarrier spacing based on an altitude of the satellite and beam coverage information. First, the satellite communications load determines a minimum value $\theta$ of a user elevation angle under the beam based on the center position of the beam and the beam coverage area. The elevation angle may be calculated by the formula of:

$$\theta = \cos^{-1}\left( \frac{R + h}{\sqrt{R^2 + (R + h)^2 - 2R(R + h)\cos\alpha}} \sin\alpha \right),$$

where R is an earth radius and has a value of 6371 kilometer (km) generally, h is the altitude of the satellite, and $\alpha$ is a corresponding central angle of the ground terminal when the minimum elevation angle is obtained. The value of $\alpha$ is related with the center position of the beam and the beam coverage area and may be calculated by the formula of:

$$\alpha = \frac{d_{aim} + d_{beam}}{R},$$

where $d_{aim}$ is a distance between the center position of the beam and a subastral spot, and $d_{beam}$ is a farthest distance between the beam boundary and the beam center. After obtaining the minimum elevation angle of the ground terminal, the orchestrator may obtain a mean value $\mu$ and a variance $\sigma$ of a root mean square delay expansion of a multipath delay based on a channel model proposed by a 3GPP organization in a technical report TR 38.821, and further obtain a maximum delay expansion $L_{DS}$, which is calculated by the formula of:

$$L_{DS} = \mu + \sigma.$$

In order to reduce an inter-symbol interference (ISI) and an inter-subcarrier interference (ICI), a CP length of an OFDM symbol needs to satisfy the limitation of:

$$L_{cp} \geq L_{DS},$$

where $L_{cp}$ is a CP length corresponding to a selected subcarrier spacing, which corresponds to a size of the subcarrier spacing one to one. A corresponding relationship has been given by 3GPP, and as shown in Table 1.

TABLE 1

| Corresponding Relationship between Subcarrier Spacing, OFDM Symbol Length and CP Length | | |
|---|---|---|
| subcarrier spacing | OFDM symbol length | CP length |
| 15 kHz | about 66.67 µs | about 4.69 µs |
| 30 kHz | about 33.33 µs | about 2.34 µs |
| 60 kHz | about 16.67 µs | about 1.17/4.17 µs |
| 120 kHz | about 8.33 µs | about 0.58 µs |

There are two CP lengths for a 60 kHz subcarrier spacing due to supporting the CP expanding. In order to minimize a CP overhead, a conventional CP is generally adopted in a communications process. Accordingly, an available maximum subcarrier spacing is determined.

At S103, the frame structure orchestrator 101 preferentially selects within a subcarrier spacing range determined at steps S101 and S102, and determines parameters such as an OFDM symbol length and a CP length based on the selected subcarrier spacing, and the specific value may refer to Table 1. At this step, a preferred mode mainly considers factors such as a maximum bandwidth, a frequency utilization rate, and a processing complexity that may be supported by the baseband processing unit. When a frequency band used by the radio frequency unit is lower than a frequency threshold $\bar{f}$, factors such as the frequency utilization rate are considered when it is ensured that the selected subcarrier spacing supports a channel bandwidth configuration, and thus a smaller subcarrier spacing should be preferred. When the frequency band used by the radio frequency unit is higher than the frequency threshold $\bar{f}$, a larger subcarrier spacing shall be used, to weaken the impact caused by the Doppler frequency offset residue as much as possible. According to a 5G communications system protocol, the frequency threshold $\bar{f}$ is generally 7 GHz.

At S104, the frame structure orchestrator 101 calculates a motion speed of the satellite relative to the earth based on the altitude of the satellite, and determines a maximum timing-advance update period based on the motion speed of the satellite relative to the earth in combination with a rotation speed of the earth. In order to avoid the inter-symbol interference (ISI), in the period, a sum of a maximum timing offset caused by a relative movement between the satellite and the ground terminal and a multipath delay expansion shall be smaller than the CP length of the OFDM symbol. The maximum timing-advance update period T is obtained by the formula of:

$$T = \frac{L_{cp} - L_{DS}}{2v} c,$$

where, $L_{DS}$ is the maximum multipath delay expansion obtained at step S102, $L_{cp}$ is the CP length corresponding to the selected sub-carrier interval, v is the maximum relative speed between the ground terminal and the satellite, and c is the speed of light. The specific calculation method is given above, which is not repeated herein.

At S105, the frame structure orchestrator 101 needs to determine a frame structure configuration period based on the maximum timing-advance update period. The configuration period needs to satisfy the formulas of:

$$P = \{5\ ms, 10\ ms\}$$

$$P \leq T,$$

where T is the maximum update period obtained at S104. In the satellite-ground communications scenario, the configuration period of 10 ms is preferred, and the frame configuration period of 5 ms is reserved as a special option. When the service has a high delay requirement, the frame configuration period of 5 ms may be adopted.

At S106, the frame structure orchestrator 101 performs an uplink and downlink frame structure orchestration based on a support service by taking a subframe as a unit. First, the orchestrator 101 determines an initial uplink and downlink time proportion based on the user service type. For example, an initial uplink and downlink time proportion of a voice service is 1:1, and an initial uplink and downlink time proportion of a service with a large downlink demand such as a high-definition video distribution is 1:3, and an initial uplink and downlink time proportion of a service with a large uplink demand such as Internet of Things data uploading is 3:1. Generally, it is assumed that an uplink and downlink time proportion of a certain service is n:m, where n is an uplink duration, and m is a downlink duration. It is assumed that one frame configuration period includes M subframes, by considering that the transmission/reception unit needs to perform an uplink and downlink conversion for a certain period, thus a total number of available subframes is M−1. In this case, a number of uplink subframes $N_{UL}$ and a number of downlink subframes $N_{DL}$ are respectively calculated according to the formulas of:

$$N_{DL} = \text{floor}\left(\frac{(M-1)m}{(m+n)}\right) + k,$$

$$N_{UL} = \text{floor}\left(\frac{(M-1)n}{(m+n)}\right) + l,$$

where, floor(*) is a round-down function; k and l are additional coefficients to ensure that a sum of the number of uplink subframes, the number of downlink subframes and protection subframe(s) is equal to the number of subframes included in the configuration period. The specific values of k and l may be obtained by the formula of:

$$(k, l) = \begin{cases} (0, 0) & \tilde{N}_{DL} + \tilde{N}_{UL} + 1 = M \\ (1, 0) & \tilde{N}_{DL} = 0, m \geq n \\ (0, 1) & \tilde{N}_{UL} = 0, n \geq m \end{cases},$$

where $\widetilde{N_{DL}}$ and $\widetilde{N_{UL}}$ are values when additional coefficients k and l are not considered, which are calculated by the formulas of:

$$\tilde{N}_{DL} = \text{floor}\left(\frac{(M-1)m}{(m+n)}\right),$$

$$\tilde{N}_{UL} = \text{floor}\left(\frac{(M-1)n}{(m+n)}\right).$$

When the orchestrator 101 obtains the number of downlink subframes and the number of uplink subframes, previous $N_{DL}$ subframes of the frame structure are downlink subframes, and last $N_{UL}$ subframes of the frame structure are uplink subframes, and one subframe between the downlink subframe and the uplink subframe is taken as an uplink and downlink protection subframe.

At S107, when the orchestrator 101 determines the frame structure configuration, the on-satellite transmission/reception unit 103 broadcasts the frame structure configuration in the same manner as a 5G system. Part of broadcast content is shown in Table 2.

TABLE 2

| Frame Structure Configuration Field | |
|---|---|
| Field Name | Content |
| referenceSubcarrierSpacing | selected subcarrier spacing |
| * dl-UL-TransmissionPeriodicity | frame configuration period |
| * nrofDownlinkSlots | the number of downlink slots |
| * nrofDownlinkSymbols | the number of downlink symbols (set to 0) |
| * nrofUplinkSlots | the number of uplink slots |
| * nrofUplinkSymbols | the number of uplink symbols (set to 0) |
| referenceSubcarrierSpacing | selected subcarrier spacing |
| * dl-UL-TransmissionPeriodicity | frame configuration period |
| * nrofDownlinkSlots | the number of downlink slots |
| * nrofDownlinkSymbols | the number of downlink symbols (set to 0) |
| * nrofUplinkSlots | the number of uplink slots |
| * nrofUplinkSymbols | the number of uplink symbols (set to 0) |

Values of the number of downlink slots nrofDownlinkSlots and the number of uplink slots nrofUplinkSlots may be calculated by the formulas of:

$$nrofDownlinkSlots = N_{DL} \times \frac{SCS}{15},$$

$$nrofUplinkSlots = N_{UL} \times \frac{SCS}{15},$$

where $N_{DL}$ is the number of downlink subframes calculated, $N_{UL}$ is the number of uplink subframes calculated, and SCS is the subcarrier spacing determined at step S103 with a unit of kHz.

The above information is included in a servingCellConfigCommon field of a system information block 1 (SIB1) and sent on a downlink shared channel (PDSCH).

Further, in an embodiment of the disclosure, determining the resource scheduling scheme based on the configuration information of the frame structure and related parameters and the historical resource scheduling information further includes:

performing a transmission/reception scheduling planning based on a service request;

storing transmission/reception scheduling planning information into a scheduling information table, in which the scheduling information table stores a transmitting moment and scheduling content of scheduling information; and transmitting scheduling information and uplink and downlink data at a corresponding moment based on information in the scheduling information table.

In detail, step S2 may include the following steps.

At S201, the radio resource scheduler 102 in the satellite communications load performs the user transmission/reception scheduling planning based on a user service request.

The input of the radio resource scheduler includes a transmission/reception requirement of each ground terminal, the scheduling information table, and the timing advance (TA) of each ground terminal. The scheduling information table stores the transmitting moment and detailed scheduling content of scheduling information. TA is a well-known term in the communications to ensure that data from each ground terminal arrives at the satellite communications load at the same moment, and the value of TA is obtained by a random access process.

The satellite communications load performing the downlink scheduling for any ground terminal A is considered first. When $t_{d0}$ is an earliest available downlink moment, that is, channel resources before to have been allocated, the radio resource scheduler 102 determines whether downlink data may be transmitted to the terminal A at the moment $t_{d0}$. In detail, the radio resource scheduler estimates a time range $(t_{d1}, t_{d2})$ during which downlink data arrives at the receiver of the user based on the TA of the ground terminal A. $t_{d1}$ and $t_{d2}$ are respectively calculated by the formulas of:

$$t_{d1} = t_{d0} + \frac{TA}{2},$$

$$t_{d2} = t_{d0} + \frac{TA}{2} + t_{slot},$$

where $t_{slot}$ is a length of a single slot. A relationship between the length of the single slot and the subcarrier spacing SCS is shown by the formula of:

$$t_{slot} = \frac{15}{SCS},$$

where a unit of the subcarrier spacing is kHz, and a unit of the slot length is ms. When the downlink data receiving time range $(t_{d1}, t_{d2})$ of the terminal A overlaps with an uplink data transmitting time range $(t_{u1}, t_{u2})$ of the terminal A, data may not be transmitted to the terminal A at the moment $t_{d0}$, and $t_{d0}$ needs to be postponed and the above steps need to be repeated; when the downlink data receiving time range $(t_{d1}, t_{d2})$ of the terminal A does not overlap with all uplink scheduling transmitting time ranges $(t_{u1}, t_{u2})$ of the terminal A in the scheduling information table, the downlink scheduling may be performed at the moment $t_{d0}$. $t_{u1}$ and $t_{u2}$ may be obtained according to uplink scheduling information of the terminal A in the scheduling information table stored in the radio resource scheduler, and a table format is illustrated in FIG. 8. The calculation of $t_{u1}$ and $t_{u2}$ are realized by the formulas of:

$$t_{u1} = t'_{u0} + K \times t_{slot} - \frac{TA}{2},$$

$$t_{u2} = t'_{u0} + K \times t_{slot} - \frac{TA}{2} + t_{slot},$$

where $$t'_{u0}$$

is a moment at which the satellite communications load transmits uplink scheduling information, K is an uplink scheduling slot offset, and a value of the uplink scheduling slot offset is introduced subsequently in the uplink scheduling part.

Figure 9:
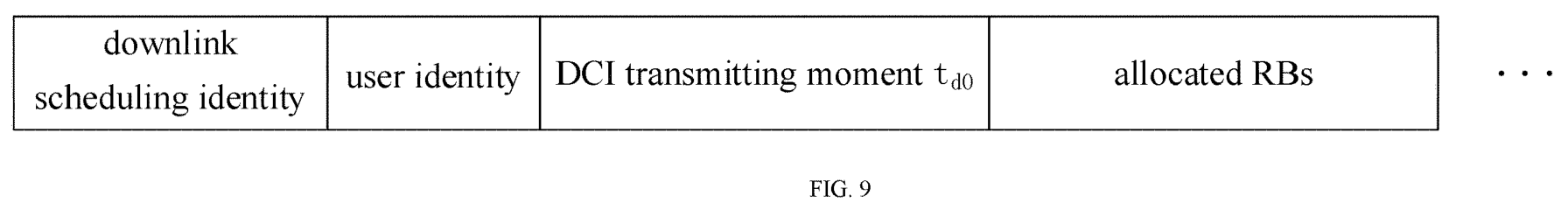

At S202, a set U is defined. The set U includes terminals that the scheduled uplink transmitting range $(t_{u1}, t_{u2})$ overlaps with the downlink receiving range $(t_{d1}, t_{d2})$ of the terminal A and a distance with the terminal A is less than a distance threshold $\bar{d}$. The radio resource scheduler 102 determines whether there is a terminal belonging to the set U based on data in the scheduling information table. If the set U is an empty set, a required channel number is calculated according to a downlink data volume of the terminal A, and downlink data transmission is performed. If the set U is not an empty set, channel resources used by the terminal in the set U within the uplink transmitting range $(t_{u1}, t_{u2})$ are checked, and orthogonal channel resources are selected for downlink transmission of the terminal A. The radio resource scheduler 102 may store related information in the scheduling information table when selecting the channel resources, and a table information format is shown in FIG. 9. The above steps ensure that the ground terminal is not in a receiving state and a transmitting state at the same time, and a cross-slot interference may not be generated between terminals.

Different from downlink scheduling, in the TDD situation, it is necessary to additionally determine the scheduling information transmitting moment $$t'_{u0}$$

and a slot offset K between scheduling information and actual transmission. A selection rule of the scheduling information transmitting moment $$t'_{u0}$$

is as follows: when there is the uplink transmission, the radio resource scheduler 102 queries the scheduling information table and determines an available downlink slot that is not completely occupied by a physical downlink control channel (PDCCH), in which case, the scheduling information transmitting moment $$t'_{u0}$$

is a corresponding downlink slot start moment. When the scheduling information transmitting moment $$t'_{u0}$$

is determined, the slot offset K between scheduling information and actual transmission is determined. The selection manner of the slot offset K is as follows: the radio resource scheduler queries the scheduling information table, and determines an unallocated uplink slot, and in order to ensure that when the ground terminal A receives uplink scheduling information, the transmission based on timing advance may be performed, the uplink slot needs to satisfy the formula of:

$$t_{u0} - t'_{u0} > TA + t_{slot},$$ 5 where $t_{u0}$ is a moment at which the satellite starts to receive uplink data, that is, a start moment of the uplink slot at the satellite side. When the uplink slot does not satisfy the formula, a next uplink slot shall be selected for a corresponding determination. When $t_{u0}$ is determined, the slot offset K may be calculated by the formula of:

$$K = \frac{t_{uo} - t'_{uo}}{t_{slot}}.$$ 15

The radio resource scheduler 102 stores uplink scheduling information in the scheduling information table when completing an uplink scheduling resource selection, and the format is shown in FIG. 8. When a multi-user scheduling is performed, uplink scheduling and downlink scheduling only need to be performed based on terminal priorities.

At S203, the satellite communications load transmits downlink control information (DCI) (i.e., scheduling information) and uplink and downlink data at a corresponding moment based on information in the scheduling information table. Information that satisfies the following conditions in the scheduling information table is cleared:

$$t_{d0} \leq t_{now} (\text{uplink scheduling}),$$

$$t'_{u0} + K \times t_{slot} - TA \leq t_{now} (downklink \text{ scheduling}).$$ 35 where, $t_{d0}$ is the scheduling information transmitting moment of the above uplink scheduling information, $$t'_{u0}$$

is the scheduling information transmitting moment of the above downlink scheduling information, K is the uplink slot offset, $t_{slot}$ is the slot length, and $t_{now}$ is a start moment of the current slot.

Similar with S1, in the transparent forwarding implementation, the task of the radio resource scheduler 102 of the satellite is completed by the radio resource scheduler 302 of the ground gateway station.

At S1, the frame structure orchestrator 101 initially controls the timing offset between the satellite and the terminal caused due to the high-speed movement of the satellite, through the time synchronization period. In order to further reduce the data demodulation error brought by the timing offset, the ground transmission/reception unit 203 may perform the timing offset compensation based on S3.

Further, in an embodiment of the disclosure, performing the timing error compensation on the resource scheduling scheme based on the timing advance obtained by the time-frequency synchronization includes:

recording, at each time-frequency synchronization, a time-frequency synchronization moment and a corresponding timing advance obtained by a ground terminal;

calculating a timing advance average change rate based on a timing advance obtained at a current moment, a timing advance obtained at a previous moment, and a time-frequency synchronization period;

calculating a timing offset at the current moment based on the timing advance average change rate and a time difference between the current moment and the previous moment; and compensating a transmitting process and a receiving process of data based on the timing offset In detail, step S3 may include the following steps.

At S301, the transmission/reception unit 203 of the ground terminal records, at each time-frequency synchronization, the time-frequency synchronization moment $t_1$ and the corresponding timing advance $TA_1$ obtained by the ground terminal when completing each time-frequency synchronization.

At S302, based on the timing advance $TA_1$ obtained at the current moment, the timing advance $TA_2$ obtained at the previous moment, and the time-frequency synchronization period T, the ground terminal 200 calculates the timing advance average change rate $\Delta TA/\Delta t$ by the formula of:

$$\frac{\Delta TA}{\Delta t} = \frac{(TA_1 - TA_2)}{T},$$

When there is no $TA_2$, that is, when the ground terminal does not perform the time-frequency synchronization with the satellite, $\Delta TA/\Delta t$ is equal to 0.

At S303, the ground terminal 200 calculates the time difference at the current moment based on the time difference between the current moment and the previous moment recorded at step S301, and the timing advance average change rate calculated at step S302, by the formula of:

$$TA_{error} = (t - t_1) \times \frac{\Delta TA}{\Delta t},$$

where, t is the current moment, $t_1$ is the previous moment, and $\Delta TA/\Delta t$ is the timing advance average change rate calculated at step S302.

At S304, the transmission/reception unit 203 of the ground terminal compensates a transmitting process and a receiving process of data based on the timing offset obtained by S303. The specific solution of compensation is as follows:

When OFDM symbol reception is performed, if the timing offset calculated at step S303 is negative, it indicates that the satellite communications load 100 and the ground terminal 200 are close to each other. In this case, when a fast Fourier transform (FFT) operation is performed on each OFDM symbol, a receiving window needs to be properly advanced. If a start point of an original FFT receiving window is $T_{FFT}$, a start point of a corrected FFT receiving window shall be calculated by the formula of:

$$T_{FFT}' = T_{FFT} + \frac{TA_{error}}{2} - T_{offset},$$

where $T_{FFT}'$ is the start point of the corrected FFT receiving window, $TA_{error}$ is the timing offset calculated at step S 303 and has a negative value, and $T_{offset}$ is an advance bias of the FFT receiving window and has the function of reducing the inter-symbol interference (ISI) caused by an inaccurate timing advance error estimation, and a value of the advance bias may be set to a fixed constant.

If the timing offset calculated at step S303 is positive, it indicates that the satellite communications load 100 is far away from the ground terminal 200. By considering that the FFT receiving window is moved backward, it may destroy a sub-frame boundary determined by the time-frequency synchronization, the baseband processing unit needs to be greatly modified, so that the same effect is achieved by performing a corresponding processing on the received signal. The specific implementation is as follows:

The sampling data in the receiving window is divided into two segments based on the timing offset calculated at step S303, in which sampling points within previous $TA_{error}/2$ are in data segment 1 and subsequent sampling points are in data segment 2. After the baseband processing unit of the transmission/reception unit 203 segments, the sampling points in the data segment 1 is moved to the data segment 2, an original OFDM symbol is reconstructed. When reconstruction is completed, the baseband processing unit performs an operation such as an FFT conversion on the OFDM symbol to complete data demodulation. Due to inaccuracy of the timing offset estimation, the compensated OFDM symbol may still have a phase error residue. However, if the phase error is small enough, the part of phase error may be corrected by channel estimation. Channel estimation is a well-known term in the art that primarily estimates an amplitude and a phase change of a signal by a pilot symbol.

When OFDM symbol transmission is performed, the transmission/reception unit 203 of the ground terminal only needs to compensate for the timing advance based on the timing offset $TA_{error}$ calculated at step S303, and a compensated timing advance may be represented by the formula of:

$$TA'=TA_1+TA_{error}-T_{offset},$$

where TA' is the compensated timing advance of the ground terminal, $TA_1$ is a timing advance obtained when the ground terminal and the satellite communications load perform the time-frequency synchronization at step S301, $TA_{error}$ is the timing advance error calculated at step S303, and $T_{offset}$ is a positive constant which aims to reduce the inter-symbol interference caused by the inaccurate timing advance error estimation.

In the transparent forwarding implementation, the task of the satellite transmission/reception unit 203 may be completed by the transmission/reception unit 303 of the ground gateway station.

Embodiment 2

Figure 4:
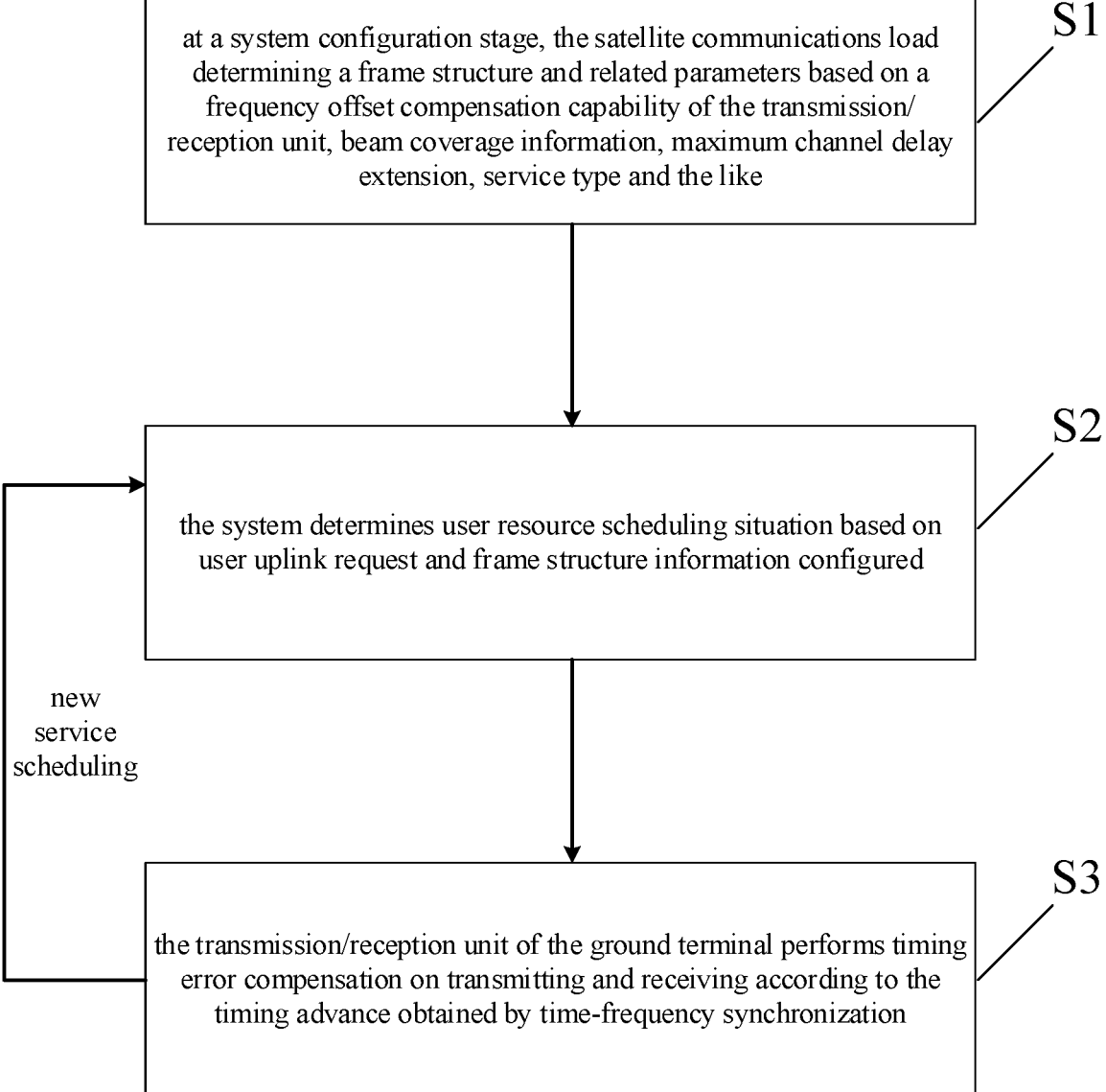
FIG. 4 is a flowchart illustrating a communications solution referred in the disclosure.

The method for TDD non-geosynchronous satellite communications according to embodiment 1 is described as a whole by referring to FIG. 2, FIG. 3, and FIG. 4. The specific calculation mode is as follow.

FIG. 2 shows components of the communications solution in the on-satellite processing implementation, which include the satellite communications load 100 and the ground terminal 200. The satellite communications load 100 is transmitted by a carrier rocket to a specified orbit. A plurality of satellite communications loads 100 form a constellation of a satellite communications system. When the satellite communications load 100 enters an orbit and before the satellite communications load 100 starts a formal operation, basic parameters of the satellite need to be initialized. The basic parameters mainly include a satellite constellation configuration, a beam coverage scheme, a satellite speed, a system frequency offset tolerance, etc., which are determined by a design of the system and may be considered as external inputs in actual implementation. FIG. 3 shows components of the communications solution in the transparent forwarding implementation, which include the satellite communications load 100, the ground terminal 200, and the ground gateway station 300.

FIG. 4 is a flowchart illustrating a communications solution referred in the disclosure. It can be seen that the communications solution referred in the disclosure includes three parts. Step S1 is responsible for initializing communications parameters of the satellite communications load on basic parameters. A subcarrier spacing and a frame structure configuration of the satellite communications load 100 are determined. When step S1 is completed, the configuration stage of the communications system ends and a scheduling stage is entered. During this stage, the ground terminal initiates a scheduling request to the satellite communications load 100 and the satellite communications load 100 performs a specific uplink and downlink scheduling process and allocates channel resources for uplink transmission and downlink reception of the ground terminal when receiving the scheduling request. The uplink and downlink channel resource allocation solution is described at step S2. When the scheduling stage is completed, the satellite communications load 100 and the ground terminal perform actual data transmission/reception on scheduled resources. The method for compensating the timing offset caused by satellite mobility in this stage is described at step S3.

Figure 5:
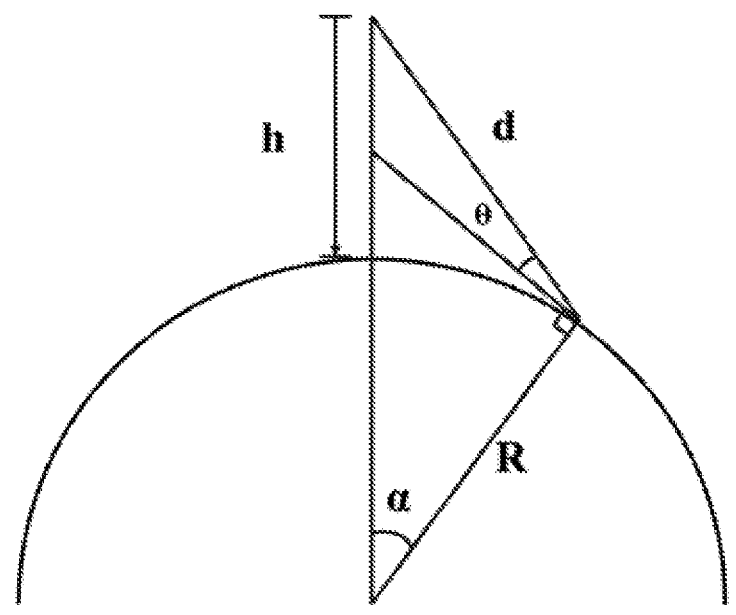
FIG. 5 is a diagram illustrating a method for calculating a minimum elevation of a ground terminal in a beam.
Figure 6:
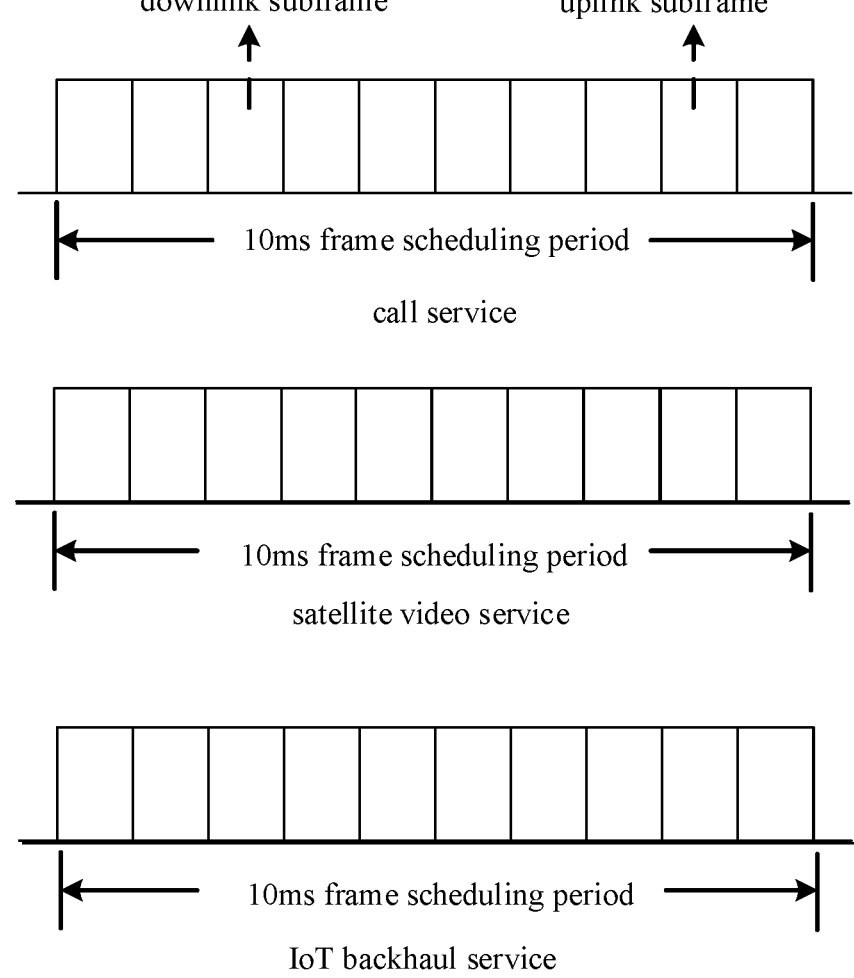
FIG. 6 is a diagram illustrating frame structure configuration solutions of different services.

Further, a communications parameter configuration process of S1 is described with reference to FIG. 5 and FIG. 6. In the description, it is illustrated by taking a low-orbit satellite with an altitude of 600 km.

At S101, the frame structure orchestrator 101 determines the minimum subcarrier spacing based on the Doppler frequency offset residue after the system frequency offset compensation. The satellite communications load 100 performs the Doppler frequency offset compensation based on positions of the satellite and the ground terminal and the current speed vector of the satellite. The Doppler frequency offset residue may be decided by the user positioning error in this frequency offset compensation mode. When the positioning error of the ground terminal is 1 km, a frequency point used by the satellite communications load 100 is 20 MHz and a speed of relative movement between the satellite and the ground terminal is 8 Km/s, then a maximum Doppler frequency offset residue is about 900 Hz after the frequency offset pre-configuration. It may be calculated that the subcarrier spacing configured by the satellite communications load 100 shall be not less than 18 kHz based on a 5% maximum tolerable frequency offset percent.

At S102, the frame structure orchestrator 101 determines the available maximum subcarrier spacing based on the satellite altitude and beam coverage information. The satellite communications load 100 may achieve dynamic beam scanning by using the satellite-borne phased array antenna. However, a beam range is limited by a physical implementation of the phased array antenna and a satellite coverage design. In the embodiments, it is deemed that a farthest distance between a satellite beam aiming spot and a subastral spot is 600 km, and a beam coverage radius is 25 km. According to the calculation manner provided in FIG. 4, the minimum elevation angle of the ground terminal is about 40°. By considering a dense urban area, it may be calculated that the maximum multipath delay is about 0.05 us by querying the 3GPP channel mode, which is less than the CP length corresponding to the 120 kHz subcarrier spacing.

Since the subcarrier spacing of the data channel in the current 5G protocol is only supported to 120 kHz, there is no special limitation for the subcarrier spacing configured by the satellite communications load 100.

At S103, according to steps S101 and S102, the frame structure orchestrator 101 determines a configurable subcarrier spacing range of 18 kHz-120 kHz. In this case, the frequency point used is higher than 7 GHZ, and the influence of the Doppler frequency offset is considered to be large, so that the 120 kHz subcarrier spacing configuration shall be preferentially considered. In this case, the corresponding CP length is 0.58 μs and the OFDM symbol length is 8.33 μs.

At S104, when the basic parameter configuration is completed, the frame structure orchestrator 101 may determine the frame structure configuration period based on the satellite speed, the multipath delay expansion, and the CP length. The calculation according to the above scenario parameters in the embodiments is performed to obtain that the maximum frame structure configuration period is 21.375 ms.

At S105, according to the determined subcarrier spacing given at S103 and the maximum frame structure configuration period given at S104, it can be seen that the frame structure configuration may adopt the maximum 10 ms configuration period.

At S106, when the configuration period is determined, the orchestrator 101 determines an uplink and downlink ratio of the frame structure based on the service type served by the satellite communications load 100, and the service type served by the satellite communications load 100 may be given during constellation design or obtained from a satellite control station instruction. FIG. 7 illustrates a configuration scheme example of different services. The frame structure configuration period is 10 ms.

At S107, the frame structure orchestrator 101 sets frame structure configuration fields of system information in FIG. 8 based on the determined uplink and downlink structure. Taking a call service scheme in FIG. 7 for example, referenceSubCarerSspacing shall be set to 120 kHz, dl-UL-TransmissionPeriodicity shall be set to 5 ms, both nrof-DownlinkSlots and nrofUplinkSlots are set to 16, and both nrofDownlinkSymbols and nrofUplinkSymbols shall be set to 0. When the specific setting of the numerical values is completed, system information may be broadcasted on a specified channel through the transmission/reception unit 103.

After step S1 is completed, the satellite communications load 100 may provide communications services for the ground terminal 200. The radio resource scheduler 102 and the transmission/reception unit 103 are responsible for resource scheduling and specific transmitting and receiving processing in the communications process. The communications resource scheduling involved at step S2 and the transmitting and receiving compensation manner of the ground terminal involved at step S3 are described below in combination with FIGS. 8 to 13.

At S201, the influence of the transmission/reception delay on the uplink and downlink scheduling is not considered in the protection interval selection at step S1. Therefore, the resource scheduling is performed directly based on the 5G protocol, thus the ground terminal needs to have the simultaneous transceiving capability. The radio resource scheduler 102 needs to determine during scheduling, to ensure that the ground terminal does not need to transmit and receive simultaneously. A downlink scheduling scenario is considered below. When the satellite communications load 100 has unscheduled data that needs to be transmitted to the ground terminal, the satellite communications load 100 determines the earliest available downlink scheduling moment $t_{do}$ through the scheduling information table, and calculates the receiving time window $(t_{d1}, t_{d2})$ used for downlink transmission at this moment. Then, the radio resource scheduler 102 traverses all uplink scheduling information of the user in the scheduling information table, and determines whether the receiving time window conflicts with the scheduled transmitting window, and if not, the downlink scheduling and transmission may be performed in this slot, and otherwise, the downlink scheduling moment $t_{do}$ is postponed to a next available slot, and the above steps are repeated. Similarly, if an uplink transmission needs to be performed, a scheduling information transmitting moment is determined based on a PDCCH channel occupation condition, and after the scheduling information transmitting moment is determined, the radio resource scheduler 102 determines the earliest available uplink scheduling moment $t_{uo}$ through the scheduling information table, and calculates the transmitting window $(t_{u1}, t_{u2})$ of the ground terminal at this moment. The radio resource scheduler traverses all downlink scheduling information of the user, and if all downlink scheduling receiving windows of the user do not conflict with the transmitting window, the uplink slot offset K is determined based on the scheduling information transmitting moment and the scheduling time. If K satisfies a minimum offset limit of uplink scheduling, the uplink scheduling may be performed on this slot, and otherwise, the uplink scheduling time $t_{uo}$ needs to be postponed to a next available uplink slot.

At S202, the radio resource scheduler 102 needs to further determine channel resources used for uplink and downlink scheduling when determining the uplink and downlink scheduling moments. Taking the downlink scheduling for example, the radio resource scheduler 102 traverses all uplink scheduling in the scheduling information table, and records a user whose transmitting window conflicts with the current downlink receiving window. If a distance between this user and the scheduling user is less than a distance threshold $\bar{d}$, channel resources used by this user are excluded when the channel resource allocation is performed. When the determination is performed, if there is no available channel resource in the slot, the slot is set to an unavailable slot, and return step S201 to select another slot again. Otherwise, the channel resource allocation is performed based on service requirements, and corresponding scheduling information is stored in the scheduling information table.

At S203, the satellite transmission/reception unit 103 obtains related data in the scheduling information table before each slot starts, and transmits scheduling information or actual data based on scheduling information. Then, the radio resource scheduler 102 determines whether the scheduling information expires, and deletes expired scheduling information.

Figure 10:
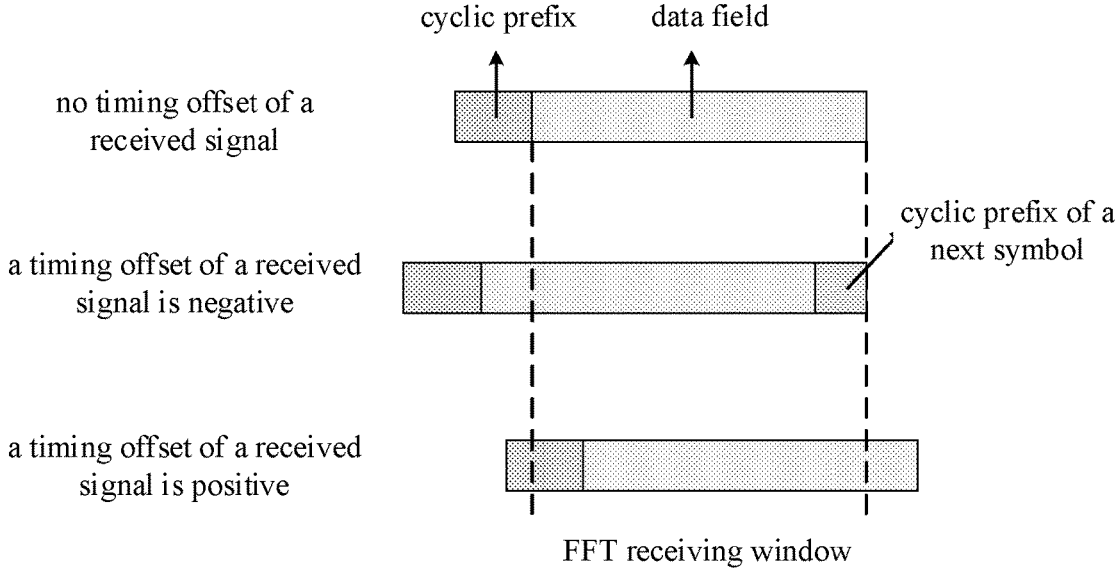
FIG. 10 is a diagram illustrating a receiving influence of a timing offset on a ground terminal in a satellite-ground scenario.
Figure 11:
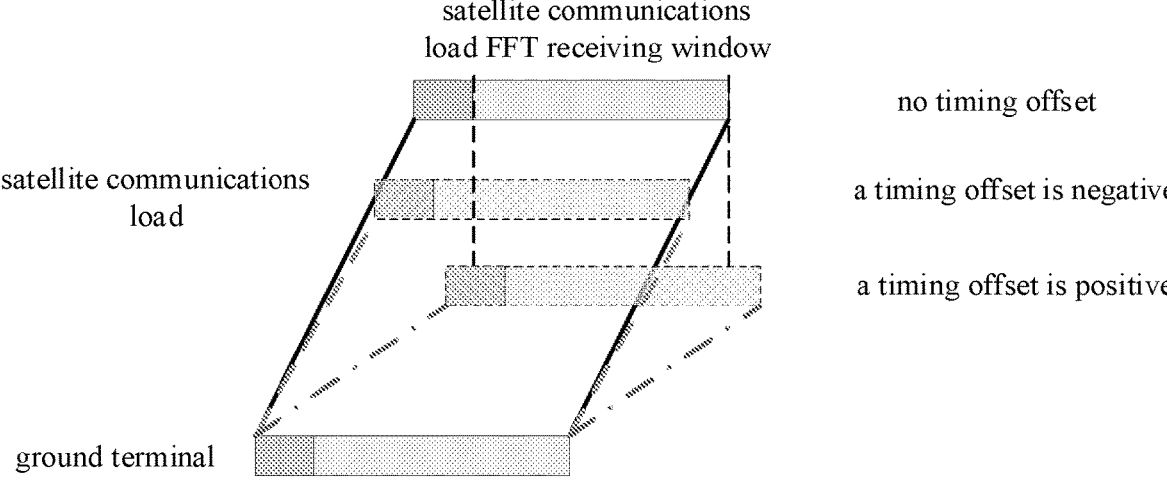
FIG. 11 is a diagram illustrating a transmitting influence of a timing offset on a ground terminal in a satellite-ground scenario.

FIG. 10 illustrates a downlink receiving timing error influence caused by a satellite movement, and FIG. 11 illustrates an uplink transmitting timing error influence caused by a satellite movement. In order to compensate for the timing error, the transmission/reception unit 203 at the ground terminal needs to perform a corresponding compensation based on step S3 when transmitting and receiving.

At S301, the transmission/reception unit 203 of the ground terminal performs a time-frequency synchronization with the satellite periodically, and records a moment of this time-frequency synchronization and an acquired TA at this time. The time-frequency synchronization and TA acquisition may be obtained by the ground terminal 200 transmitting a known sequence to the satellite communications load 100, which is known in the mobile communications, which are not repeated herein.

At S302, the ground terminal calculates a timing advance average change rate based on $TA_1$ acquired by the current synchronization and $TA_2$ acquired by the previous synchronization. When there is no previously synchronized TA at the ground terminal, the timing advance average change rate is 0. Considering an non-geosynchronous satellite scenario with an altitude of 600 km, the elevation angle of the ground terminal is 40°, and if $TA_1$–$TA_2$ is −0.67 μs, the timing advance change rate may be calculated as −30 μs/s.

Figure 12:
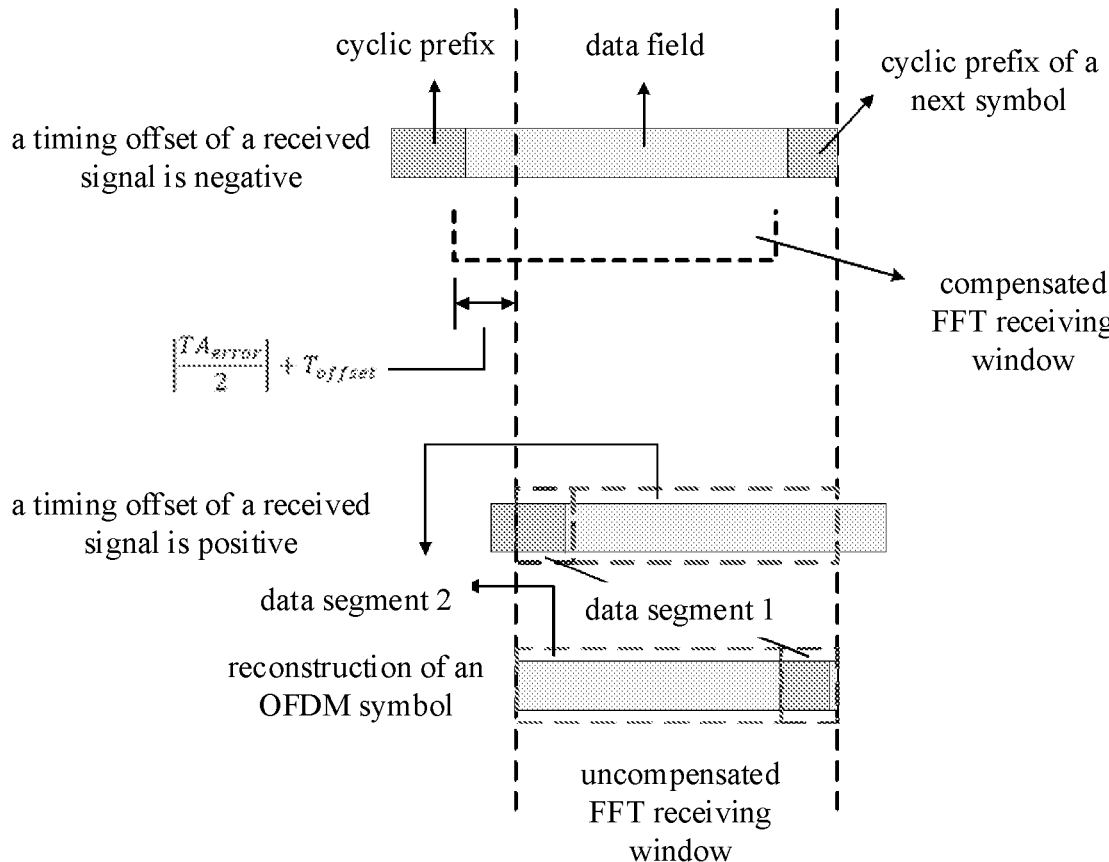
FIG. 12 is a diagram illustrating that a ground terminal performs a receiving compensation based on the solution provided in the disclosure.
Figure 13:
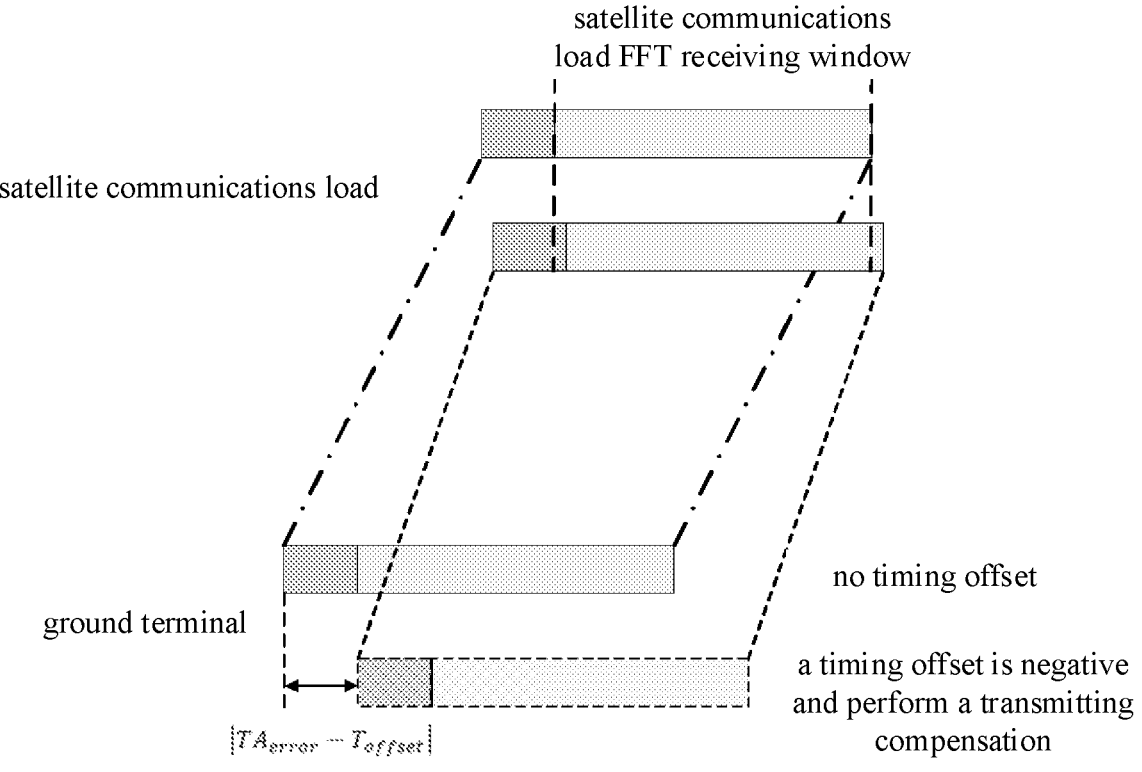
FIG. 13 is a diagram illustrating that a ground terminal performs a transmitting compensation based on the solution provided in the disclosure.

At S303, the transmission/reception unit 203 of the ground terminal estimates the timing offset at the current moment based on the time difference between the current moment and the previous moment and the timing advance change rate. When the time interval between the current moment and the previous moment is 12 ms, the estimated timing offset shall be 0.36 μs. At S304, the transmission/reception unit 203 of the ground terminal compensates for the transmitting process and the receiving process based on the estimated timing offset. When the receiving compensation is considered, if the calculated timing offset is negative, the baseband processing unit in the transmission/reception unit 203 shall advance the receiving window. In the example, approximately 0.18 μs shall be advanced. When the calculated timing offset is positive, the baseband processing unit shall first remove a cyclic prefix based on an original process, and perform an OFDM symbol reconstruction on result data, and place a previous part of the result data at a tail of the result data, in which case, a duration of the part is about 0.18 μs. When the transmitting compensation is considered, the transmission/reception unit 203 of the ground terminal only needs to obtain the timing advance estimation value at the current moment by adding the calculated timing advance offset and the timing advance, and perform the uplink transmitting based on the estimation value. FIG. 11 illustrates a receiving compensation, and FIG. 12 illustrates a transmitting compensation.

According to the method for TDD non-geosynchronous satellite communications method provided in embodiments of the disclosure, on one hand, the configuration problem of basic parameters in TDD non-geosynchronous low-orbit satellite communications is solved; on the other hand, an interference problem of a service user of a single satellite is solved; and a large demodulation error rate caused by a timing error during OFDM symbol demodulation is relieved.

In order to implement the above embodiments, an apparatus for TDD non-geosynchronous satellite communications is provided in the disclosure.

Figure 14:
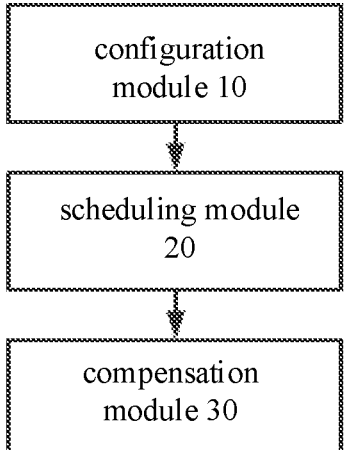
FIG. 14 is a diagram illustrating an apparatus for TDD non-geosynchronous satellite communications according to embodiments of the disclosure.

FIG. 14 is a diagram illustrating a structure of an apparatus for TDD non-geosynchronous satellite communications according to embodiments of the disclosure.

As illustrated in FIG. 14, the apparatus for TDD non-geosynchronous satellite communications includes a configuration module 10, a scheduling module 20, and a compensation module 30.

The configuration module 10 is configured to configure a frame structure and related parameters of a satellite based on a channel feature, a service feature, and a transmission/reception unit capability.

The scheduling module 20 is configured to determine a resource scheduling scheme based on configuration information of the frame structure and related parameters and historical resource scheduling information.

The compensation module 30 is configured to perform a timing error compensation on the resource scheduling scheme based on a timing advance obtained by time-frequency synchronization, and perform a data transmission/reception based on the resource scheduling scheme after the timing error compensation.

Further, in an embodiment of the disclosure, the configuration module is further configured to:

determine a maximum subcarrier spacing based on a center position of a respective beam, a position of the satellite, and a speed and a direction of the satellite;

determine an OFDM symbol length and a CP length based on the maximum subcarrier spacing;

calculate a motion speed of the satellite relative to the earth based on an altitude of the satellite, and determine a maximum timing-advance update period based on the motion speed of the satellite relative to the earth in combination with a rotation speed of the earth;

determine a frame structure configuration period based on the maximum timing-advance update period; and perform an uplink and downlink frame structure orchestration based on a support service by taking a subframe as a unit.

Further, in an embodiment of the disclosure, the scheduling module is further configured to:

perform a transmission/reception scheduling planning based on a service request;

store transmission/reception scheduling planning information into a scheduling information table, wherein the scheduling information table stores a transmitting moment and scheduling content of scheduling information; and transmit scheduling information and uplink and downlink data at a corresponding moment based on information in the scheduling information table.

Further, in an embodiment of the disclosure, the compensation module is further configured to:

record, at each time-frequency synchronization, a time-frequency synchronization moment and a corresponding timing advance obtained by a ground terminal;

calculate a timing advance average change rate based on a timing advance obtained at a current moment, a timing advance obtained at a previous moment, and a time-frequency synchronization period;

calculate a timing offset at the current moment based on the timing advance average change rate and a time difference between the current moment and the previous moment; and compensate a transmitting process and a receiving process of data based on the timing offset.

To achieve the above purpose, a computer device including a memory, a processor, and a computer program stored on the memory and executable by the processor, is provided in a third aspect of embodiments of the disclosure. When the processor executes the computer program, the method for TDD non-geosynchronous satellite communications as described above is implemented.

To achieve the above purpose, a computer-readable storage medium with a computer program stored thereon is provided in a fourth aspect of embodiments of the disclosure. When the computer program is executed by a processor, the method for TDD non-geosynchronous satellite communications as described above is implemented.

The method and the apparatus for TDD non-geosynchronous satellite communications provided in embodiments of the disclosure may have the following advantages. (1) Compared with the conventional configuration solution, the communications method provided in the disclosure may perform the dynamic configuration on the OFDM symbol length, the CP length, and the frame structure configuration for application scenarios such as a satellite beam is fixed relative to the satellite and fixed relative to the ground, which is beneficial to achieving the flexibility and intelligence of the TDD non-geosynchronous low orbit satellite communications network. (2) The solution of the disclosure is not only applicable to the conventional transparent forwarding deployment mode, but also applicable to the on-satellite processing deployment mode, and different network construction modes may be adopted in actual deployment based on different requirements and conditions. (3) The solution of the disclosure may schedule by using timing advance information or position information of a user, so that problems such as the cross-slot interference and simultaneous transceiving of the user, caused by the large satellite-ground link transmission/reception delay, are overcome in the TDD mode, so that satellite communications based on TDD may also adopt an on-demand scheduling mechanism similar to the ground, which improves the utilization rate of channel resources, thereby reducing the network construction cost. (4) According to the solution of the disclosure, demodulation of the OFDM symbol may be compensated by using timing advance information of the user, thereby reducing the high bit error rate caused by a high-speed movement and inaccurate timing of the satellite in actual transmission/reception.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the disclosure. Furthermore, the particular features, structures, materials, or characteristics may be combined in any suitable manner in one or more embodiments or examples.

It is to be understood that, in the description of the disclosure, terms of "first" and "second" are only used for description and cannot be seen as indicating or implying relative importance. Unless otherwise stipulated and restricted, it is to be explained that terms of "linkage" and "connection" shall be understood broadly, for example, it could be mechanical connection or electrical connection; it could be direct linkage, indirect linkage via intermediate medium. Those skilled in the art shall understand the concrete notations of the terms mentioned above according to specific circumstances. Furthermore, unless otherwise explained, it is to be understood that a term of "a plurality of" refers to two or more.

It should be understood that, notwithstanding the embodiments of the disclosure are shown and described above, the above embodiments are exemplary in nature and shall not be construed as a limitation of the disclosure. Those skilled in the art may change, modify, substitute and vary the above embodiments within the scope of the disclosure.

What is claimed is:

1. A method for time division duplex (TDD) non-geosynchronous satellite communications, performed by an apparatus for TDD non-geosynchronous satellite communications comprising a frame structure orchestrator, a radio resource scheduler, a transceiver and a ground transmission/reception unit, comprising:

configuring, by the frame structure orchestrator and the transceiver, a frame structure and related parameters of a satellite based on a channel feature, a service feature, and a transmission/reception unit capability;

determining, by the radio resource scheduler and the transceiver, a resource scheduling scheme based on configuration information generated by configuring the frame structure and related parameters and historical resource scheduling information obtained from a scheduling information table; and performing, by the ground transmission/reception unit, a timing error compensation on the resource scheduling scheme based on a timing advance obtained by time-frequency synchronization, and performing a data transmission/reception based on the resource scheduling scheme after the timing error compensation.

2. The method of claim 1, wherein configuring, by the frame structure orchestrator and the transceiver, the frame structure and related parameters of the satellite based on the channel feature, the service feature, and the transmission/reception unit capability comprises:

performing a Doppler frequency offset pre-compensation on a respective beam based on a center position of the respective beam, a position of the satellite, and a speed and a direction of the satellite;

determining a maximum subcarrier spacing based on an altitude of the satellite and beam coverage information;

determining an orthogonal frequency division multiplexing (OFDM) symbol length and a cyclic prefix (CP) length based on the maximum subcarrier spacing;

calculating a motion speed of the satellite relative to the earth based on the altitude of the satellite, and determining a maximum timing-advance update period based on the motion speed of the satellite relative to the earth in combination with a rotation speed of the earth;

determining a frame structure configuration period based on the maximum timing-advance update period; and performing an uplink and downlink frame structure orchestration based on a support service by taking a subframe as a unit.

3. The method of claim 1, wherein determining, by the radio resource scheduler and the transceiver, the resource scheduling scheme based on the configuration information generated by configuring the frame structure and related parameters and the historical resource scheduling information obtained from the scheduling information table further comprises:

performing a transmission/reception scheduling planning based on a service request;

storing transmission/reception scheduling planning information into the scheduling information table, wherein the scheduling information table stores a transmitting moment and scheduling content of scheduling information; and transmitting scheduling information and uplink and downlink data at a corresponding moment based on information in the scheduling information table.

4. The method of claim 1, wherein performing, by the ground transmission/reception unit, the timing error compensation on the resource scheduling scheme based on the timing advance obtained by the time-frequency synchronization comprises:

recording, at each time-frequency synchronization, a time-frequency synchronization moment and a corresponding timing advance obtained by a ground terminal;

calculating a timing advance average change rate based on a timing advance obtained at a current moment, a timing advance obtained at a previous moment, and a time-frequency synchronization period;

calculating a timing offset at the current moment based on the timing advance average change rate and a time difference between the current moment and the previous moment; and compensating a transmitting process and a receiving process of data based on the timing offset.

5. A computer device, comprising:

a memory for storing a computer program; and a processor, wherein the processor is configured to perform:

configuring a frame structure and related parameters of a satellite based on a channel feature, a service feature, and a transmission/reception unit capability;

determining a resource scheduling scheme based on configuration information generated by configuring the frame structure and related parameters and historical resource scheduling information obtained from a scheduling information table; and performing a timing error compensation on the resource scheduling scheme based on a timing advance obtained by time-frequency synchronization, and performing a data transmission/reception based on the resource scheduling scheme after the timing error compensation.

6. The device of claim 5, wherein the processor is configured to perform:

performing a Doppler frequency offset pre-compensation on a respective beam based on a center position of the respective beam, a position of the satellite, and a speed and a direction of the satellite;

determining a maximum subcarrier spacing based on an altitude of the satellite and beam coverage information;

determining an orthogonal frequency division multiplexing (OFDM) symbol length and a cyclic prefix (CP) length based on the maximum subcarrier spacing;

calculating a motion speed of the satellite relative to the earth based on the altitude of the satellite, and determining a maximum timing-advance update period based on the motion speed of the satellite relative to the earth in combination with a rotation speed of the earth;

determining a frame structure configuration period based on the maximum timing-advance update period; and performing an uplink and downlink frame structure orchestration based on a support service by taking a subframe as a unit.

7. The device of claim 5, wherein the processor is configured to perform:

performing a transmission/reception scheduling planning based on a service request;

storing transmission/reception scheduling planning information into the scheduling information table, wherein the scheduling information table stores a transmitting moment and scheduling content of scheduling information; and transmitting scheduling information and uplink and downlink data at a corresponding moment based on information in the scheduling information table.

8. The device of claim 5, wherein the processor is configured to perform:

recording, at each time-frequency synchronization, a time-frequency synchronization moment and a corresponding timing advance obtained by a ground terminal;

calculating a timing advance average change rate based on a timing advance obtained at a current moment, a timing advance obtained at a previous moment, and a time-frequency synchronization period;

calculating a timing offset at the current moment based on the timing advance average change rate and a time difference between the current moment and the previous moment; and compensating a transmitting process and a receiving process of data based on the timing offset.

9. A non-transitory computer-readable storage medium having stored therein instructions that, when executed by a processor of a computer device, causes the computer device to perform a method for TDD non-geosynchronous satellite communications, the method comprising:

configuring a frame structure and related parameters of a satellite based on a channel feature, a service feature, and a transmission/reception unit capability;

determining a resource scheduling scheme based on configuration information generated by configuring the frame structure and related parameters and historical resource scheduling information obtained from a scheduling information table; and performing a timing error compensation on the resource scheduling scheme based on a timing advance obtained by time-frequency synchronization, and performing a data transmission/reception based on the resource scheduling scheme after the timing error compensation.

10. The non-transitory computer-readable storage medium of claim 9, wherein configuring the frame structure and related parameters of the satellite based on the channel feature, the service feature, and the transmission/reception unit capability comprises:

performing a Doppler frequency offset pre-compensation on a respective beam based on a center position of the respective beam, a position of the satellite, and a speed and a direction of the satellite;

determining a maximum subcarrier spacing based on an altitude of the satellite and beam coverage information;

determining an orthogonal frequency division multiplexing (OFDM) symbol length and a cyclic prefix (CP) length based on the maximum subcarrier spacing;

calculating a motion speed of the satellite relative to the earth based on the altitude of the satellite, and determining a maximum timing-advance update period based on the motion speed of the satellite relative to the earth in combination with a rotation speed of the earth;

determining a frame structure configuration period based on the maximum timing-advance update period; and performing an uplink and downlink frame structure orchestration based on a support service by taking a subframe as a unit.

11. The non-transitory computer-readable storage medium of claim 9, wherein determining the resource scheduling scheme based on the configuration information generated by configuring the frame structure and related parameters and the historical resource scheduling information obtained from the scheduling information table further comprises:

performing a transmission/reception scheduling planning based on a service request;

storing transmission/reception scheduling planning information into the scheduling information table, wherein the scheduling information table stores a transmitting moment and scheduling content of scheduling information; and transmitting scheduling information and uplink and downlink data at a corresponding moment based on information in the scheduling information table.

12. The non-transitory computer-readable storage medium of claim 9, wherein performing the timing error compensation on the resource scheduling scheme based on the timing advance obtained by the time-frequency synchronization comprises:

recording, at each time-frequency synchronization, a time-frequency synchronization moment and a corresponding timing advance obtained by a ground terminal;

calculating a timing advance average change rate based on a timing advance obtained at a current moment, a timing advance obtained at a previous moment, and a time-frequency synchronization period;

calculating a timing offset at the current moment based on the timing advance average change rate and a time difference between the current moment and the previous moment; and compensating a transmitting process and a receiving process of data based on the timing offset.

\* \* \* \* \*